(12) United States Patent
Tayama et al.

(10) Patent No.: US 6,838,045 B2
(45) Date of Patent: Jan. 4, 2005

(54) APPARATUS FOR METAL PURIFICATION

(75) Inventors: Kishio Tayama, Akita (JP); Shunichi Kimura, Akita (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 10/686,114

(22) Filed: Oct. 14, 2003

(65) Prior Publication Data

US 2004/0089986 A1 May 13, 2004

Related U.S. Application Data

(62) Division of application No. 10/112,363, filed on Mar. 29, 2002.

(30) Foreign Application Priority Data

Jan. 28, 2002 (JP) ......................................... 2002-018183

(51) Int. Cl.⁷ .......................... C22B 19/16; C22B 26/22
(52) U.S. Cl. ........................................ 266/149; 266/208
(58) Field of Search .................................. 266/149, 208, 266/209, 210, 211, 905

(56) References Cited

U.S. PATENT DOCUMENTS

| 4,045,006 A | 8/1977 | Cherednichenko et al. |
| 5,582,630 A | 12/1996 | Lam et al. |
| 6,375,893 B1 * | 4/2002 | Raschke et al. ............. 266/208 |
| 6,444,164 B2 * | 9/2002 | Tayama et al. ............. 266/208 |
| 2003/0145684 A1 * | 8/2003 | Tayama et al. ............. 266/208 |
| 2004/0083854 A1 * | 5/2004 | Tayama et al. ............. 266/208 |

FOREIGN PATENT DOCUMENTS

| GB | 569472 A | 5/1945 |
| JP | 10-121160 A | 5/1998 |
| JP | 11-502565 A | 3/1999 |
| WO | WO 96/26297 A | 8/1996 |

* cited by examiner

Primary Examiner—Scott Kastler
(74) Attorney, Agent, or Firm—Frishauf, Holtz, Goodman & Chick, P.C.

(57) ABSTRACT

A purification apparatus including a vertical stack of a feed heating zone having a feed crucible 1, a condensation zone having a plurality of condensation vapor passage plates 5, a solidification zone having a solidification crucible 2 and an entrapment/solidification zone having a plurality of entrapment/solidification vapor passage plates 7.

13 Claims, 3 Drawing Sheets

APPARATUS FOR METAL PURIFICATION

CROSS-REFERENCE TO RELATED APPLICATION

This application is a Divisional application of application Ser. No. 10/112,363 filed Mar. 29, 2002, the entire contents of which are hereby incorporated by reference herein.

BACKGROUND OF THE INVENTION

1. Field of the Invention

This invention relates to metals such as magnesium (Mg), cadmium (Cd), antimony (Sb), zinc (Zn) and tellurium (Te) that have purities of about 99.9999 wt % (6N) and above which have been obtained by heating feed metals and distilling them for purification. The invention also relates to a method and an apparatus for producing such high-purity metals.

2. Background Information

In the manufacture of semiconductor devices which are seeing increasing demand as the result of the recent sophistication of electronics and declining cost, the need to use feed metals of higher purity is ever increasing. The fabrication of semiconductor devices such as blue-light laser diodes presents a demand for high-purity magnesium. In particular, the development of double heterostructure blue-laser diode devices is highly dependent on the quality of the material used in the cladding layer. Metals of high purity such as high-purity magnesium (Mg) generally contain sulfur (S), sodium (Na), aluminum (Al), silicon (Si), potassium (K), calcium (Ca), chromium (Cr), manganese (Mn), iron (Fe), nickel (Ni), copper (Cu), arsenic (As), antimony (Sb), lead (Pb), fluorine (F), phosphorus (P), chlorine (Cl), silver (Ag), bismuth (Bi), gallium (Ga), lithium (Li), molybdenum (Mo), titanium (Ti) and boron (B) (these elements contained in Mg are collectively referred to as impurities and the sum of their contents is referred to as the total impurity content; in the case where high-purity Mg is used as a semiconductor material, the inclusion of up to 100 ppm of zinc need not be particularly avoided and presents no problem in use; hence, a zinc content of up to 100 ppm is not dealt with as an impurity). The impurities in the high-purity magnesium used in the cladding layer of the double heterostructure blue-laser diode and for other purposes are by no means desirable for the performance of semiconductor lasers and this is another reason for the increasing need to produce magnesium and other metals of ultra-high purity. Magnesium and zinc are metals having comparatively high vapor pressures and more difficult to purify than other semiconductor materials by distillation.

In the conventional process of producing high-purity metals by purification through distillation of metals such as magnesium, the metal vapor generated by heating in a high-vacuum atmosphere is recovered by allowing it to solidify on cooling plates in the passageway of vapors. For example, International Patent Publication No. 502565/1999 describes a technique in which a plurality of baffle plates are provided over three zones in a passageway for the magnesium vapor generated by heating a magnesium feed within a crucible in a high-vacuum atmosphere and the magnesium vapor is cooled with the temperature of the baffle plates being controlled to decrease gradually toward the higher position, thereby utilizing the difference between the solidification temperatures of impurities in the magnesium vapor such that high-purity magnesium is fractionally solidified in a specified zone in the intermediate section.

However, it is difficult on an industrial scale to ensure that only the desired high-purity metal such as magnesium is efficiently cooled and recovered from the metal vapor in the passageway of vapors. If the separation of high-purity metal is to be achieved by the difference in solidification temperature, it is difficult to exclude the entrance of impurities having only a small difference in solidification temperature. In order to obtain the desired high-purity magnesium, the specified zone for recovery must maintain a very small temperature range but this only results in a very low yield. On the other hand, if one wants a higher yield, the purity of magnesium has to be lowered. If smaller cooling plates are used with a view to maintaining a smooth passage of vapors during recovery of the high-purity metal, the yield remain low and is within a limited range since the amount of recovery depends on the size of the cooling plates. If larger cooling plates are used, the vapor passageway becomes so narrow as to prevent the passage of metal vapors, again causing the yield to remain low in a limited range.

SUMMARY OF THE INVENTION

An object, therefore, of the invention is to produce magnesium and other metals of high purity from feed metals by purification through distillation.

Another object of the invention is to provide a purification process and apparatus by which the desired high-purity metal can be produced in high yield and efficiency at low cost.

The present inventors conducted intensive studies in order to solve the aforementioned problems of the prior art. As a result, they found that by condensing part of the vapor of a feed metal in a crucible instead of causing all vapor to solidify fractionally in the passageway of vapors, a molten condensate with an increased total content of impurities would be obtained and that by returning the melt into the crucible, the impurities are concentrated in the feed metal.

To attain its first to third objects, the present invention provides the following.

1. A high-purity metal containing Cl, F and S in a respective amount of no more than 0.1 ppm, with the total impurity content being no more than 1 ppm.

2. The high-purity metal of item 1, in which said metal is magnesium or zinc.

3. A process for metal purification comprising a first step for heating a feed metal in a feed crucible 1 (the reference numeral is keyed to the accompanying drawing and this applies to the following description) to generate the vapor of said metal, a second step for directing said vapor into a condensation passageway for vapors, where part of the vapor is condensed to generate a molten condensate, and a third step for directing said vapor through said condensation passageway for vapors into a solidification crucible 2 so that it is cooled to get said metal in high-purity form to solidify from it.

4. The process of item 3, which further includes a fourth step for returning said molten condensate into said feed crucible 1.

5. An apparatus for metal purification comprising a vessel 3 for creating a vacuum atmosphere, a feed heating zone with an open top that contains a feed crucible 1 to be charged with a feed metal, a condensation zone on top of said feed heating zone in which condensation vapor passage plates 5 that are each convex downwardly and provided with a vapor passage hole 4 in a generally central area and condensation vapor passage plates 5 that are each convex upwardly and provided with a plurality of vapor passage holes 4 in the non-central area alternate with each other at given spacings and are stacked in general symmetry with respect to a plane, and a solidification zone on top of said condensation zone for solidifying said metal.

6. An apparatus for metal purification comprising a vessel 3 for creating a vacuum atmosphere, a feed heating zone with an open top that contains a feed crucible 1 to be charged with a feed metal to generate the vapor of said metal, a condensation zone with an open top and an open bottom communicating with the top of said feed heating zone and in which a plurality of condensation vapor passage plates 5 that form a condensation passageway for vapors in which said vapor is allowed to pass upwardly only through the vapor passage holes 4 made in said plates 5 are stacked vertically at given spacings, and a solidification zone with an open top and an open bottom communicating with the top of said condensation zone and which contains a solidification crucible 2 which is cooled externally so that said metal of high purity is solidified from said vapor after it has passed through said condensation zone, said plurality of condensation vapor passage plates 5 being such that condensation vapor passage plates 5 in the form of an inverted cone or dome which are each convex downwardly and provided with a vapor passage hole 4 in a generally central area and condensation vapor passage plates 5 in a conical or dome shape that are each convex upwardly and provided with a plurality of vapor passage holes 4 in the non-central area alternate with each other and are stacked in general symmetry with respect to a plane, and a heater 6 for heating said feed heating zone and said condensation zone being provided within or outside said vessel 3.

7. The apparatus of item 6, in which said vessel 3 for creating a vacuum atmosphere further contains an entrapment/solidification zone with an open top and an open bottom communicating with the top of said solidification zone and in which a plurality of entrapment/solidification vapor passage plates 7 that form an entrapment/solidification passageway for vapors which is cooled externally and in which said vapor after passing through said condensation zone is allowed to pass upwardly only through the vapor passage holes 4 made in said plates 7, thereby solidifying said vapor are stacked vertically at given spacings, said plurality of entrapment/solidification vapor passage plates 7 being such that entrapment/solidification vapor passage plates 7 in the form of an inverted cone or dome which are each convex downwardly and provided with a plurality of vapor passage hole 4 in the non-central area and entrapment/ solidification vapor passage plates 7 in a conical or dome shape that are each convex upwardly and provided with a vapor passage hole 4 in a generally central area alternate with each other and are stacked in general symmetry with respect to a plane.

DETAILED DESCRIPTION OF THE INVENTION

Figure 2A:
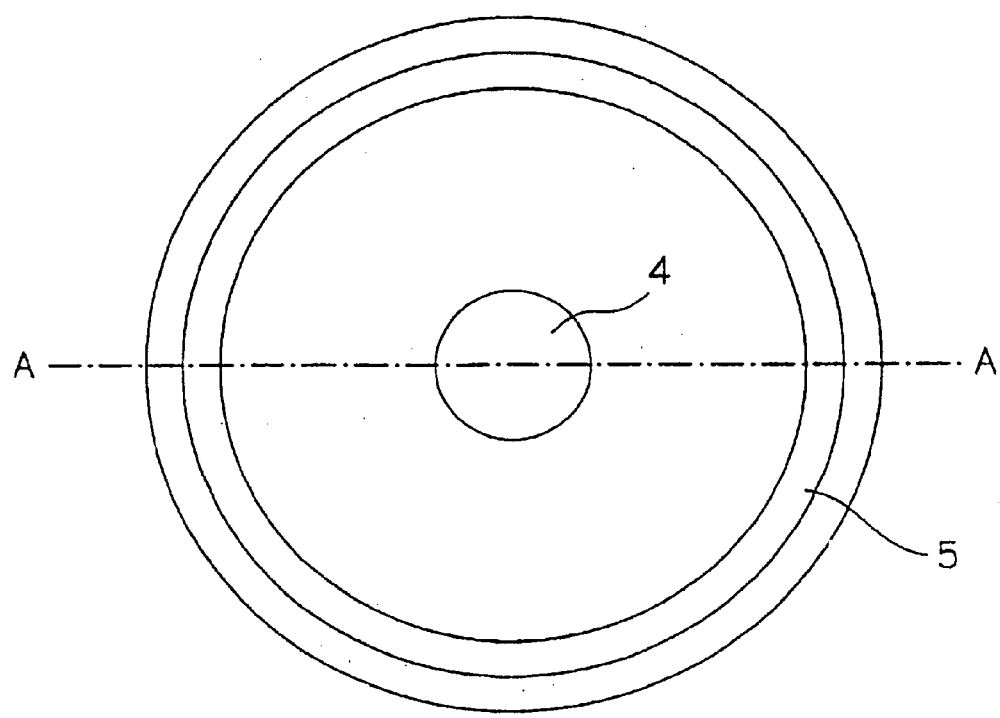
FIG. 2A is a plan view of a condensation vapor passage plate 5 that is convex downwardly and which has a single vapor passage hole 4 made in the center.
Figure 2B:
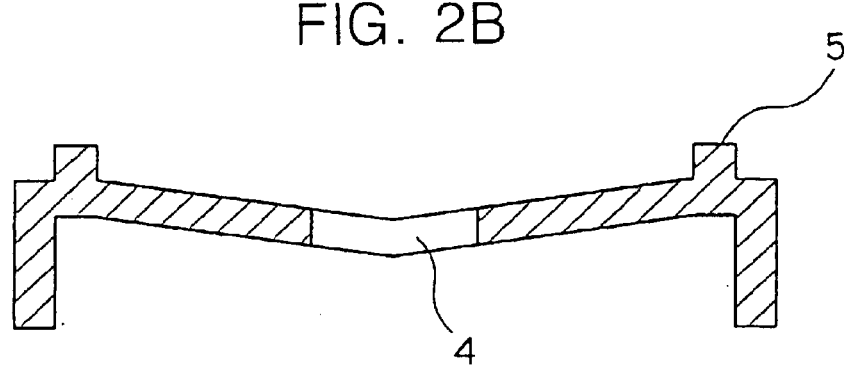
FIG. 2B is section A-A of FIG. 2A.
Figure 3A:
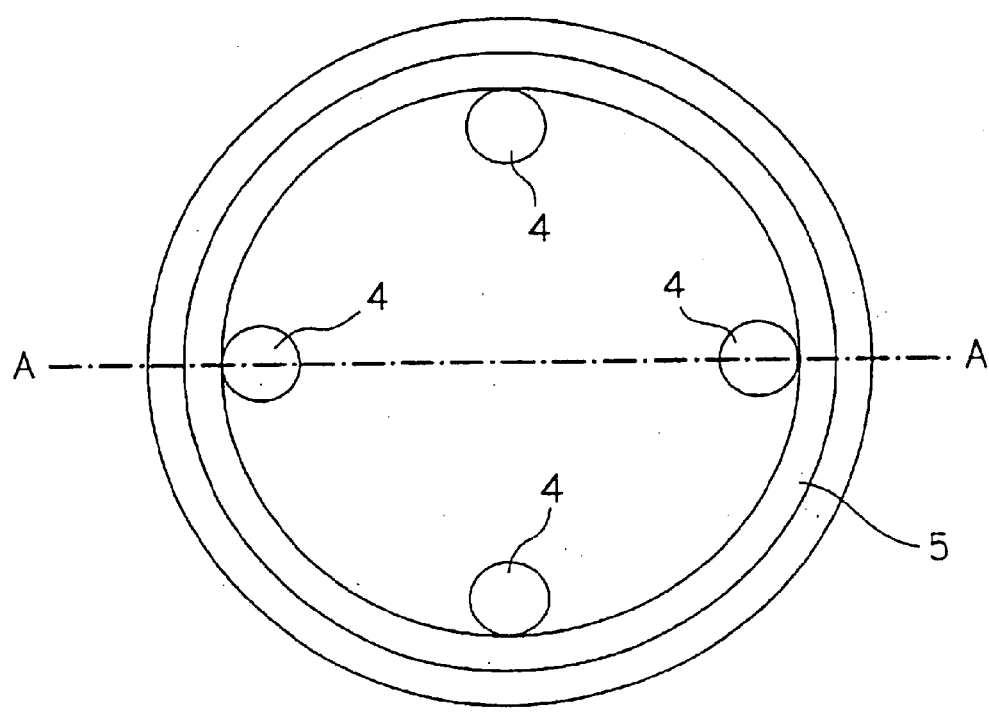
FIG. 3A is a plan view of a condensation vapor passage plate 5 that is convex upwardly and which has four vapor passage holes 4 made at equal spacings on the periphery.
Figure 3B:
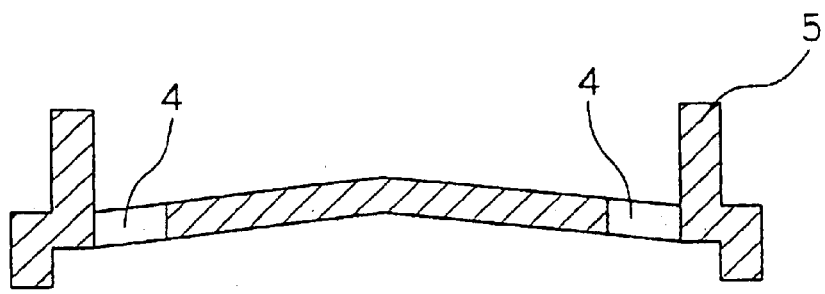
FIG. 3B is section A-A of FIG. 3A.

Considering physical properties such as melting point, boiling point and vapor pressure, Mg is not the only metal that can be purified by the present invention and other metals such as Cd, Sb, Zn and Te that can be purified by distillation are also processable by the present invention. Therefore, the following description is mainly directed to Mg as it is purified by an apparatus generally shown in FIG. 1 using condensation vapor passage plates 5 shown in FIGS. 2 and 3.

High-purity metals such as Mg according to the present invention have a total impurity content of no more than 1 ppm (the unit ppm as used herein is by weight). According to the purification method of the invention, a feed metal in a feed crucible 1 is heated to generate its vapor (in the first step) and part of the metal vapor is condensed (in the second step) before the solidification step (the third step), whereby a molten condensate having a high enough total impurity content is obtained preferentially and returned into the feed crucible 1 (in the fourth step) so that the impurities are concentrated in the feed crucible 1. As a result, Cl, F and S that bind more readily and strongly to semiconductor forming elements than any other impurities and which therefore are considered noisome in the slightest quantities can each be reduced to a level of no more than 0.1 ppm.

The vacuum atmosphere required for the practice of the purification method of the invention has preferably a pressure of 13 Pa ($10^{-1}$ Torr) or below, more preferably between 13 and $1.3 \times 10^{-1}$ Torr ($10^{-1} \sim 10^{-3}$ Torr). The residual gas in the vacuum atmosphere may be air but it is preferably a non-oxidizing gas such as a rare gas (e.g. argon). The method of forming the vacuum atmosphere is not limited in any particular way; in a preferred method, the vessel 3 filled with air or a non-oxidizing gas is aspirated with a vacuum pump or the like to create a negative pressure that is equal to the above stated degree of vacuum and which is maintained during the procedure of purification. The vessel 3 is preferably made of quartz so that its interior can be seen from the outside; more preferably, the overall rigidness of the whole apparatus may be increased by designing the wall of the vessel to have a dual structure.

The feed metal has preferably a purity of at least 99.9 wt % (3N). The use of a less pure feed metal will result in a contamination of the purification apparatus with the impurities, particularly in the areas in contact with the metal, leading to the need to perform frequent maintenance operations.

The feed metal put into the feed crucible 1 is heated to a temperature higher than the melting point of the metal, say, between 700 and 800° C., to generate its vapor. Part of the vapor is condensed and returned into the feed crucible 1 as it passes through the vapor passage holes 4 in a plurality of condensation vapor passage plates 5 stacked vertically at given spacings on top of the feed crucible 1. The vapor passing through the holes 4 is cooled in a solidification crucible 2 on top of the stack of the plates 5 so that a high-purity metal is solidified. The vapor going up through the solidification crucible 2 passes through the vapor passage holes 4 in a plurality of entrapment/solidification vapor passage plates 7 stacked vertically at given spacings on top of the solidification crucible 2, whereby the vapor is cooled and mostly solidified.

The feed heating zone equipped with the feed crucible 1 and the condensation zone where a plurality of condensation vapor passage plates 5 are placed in superposition are both controlled in temperature by means of a heater 6; in the feed heating zone, the feed metal is melted to generate its vapor and in the condensation zone, part of the metal vapor is condensed to give a molten condensate having an increased total impurity content which is then returned into the feed crucible 1.

While a plurality of condensation vapor passage plates 5 are stacked on top of the feed crucible 1, the bottommost plate is preferably positioned at least 30 mm above the liquid level of the molten metal in the feed crucible 1 so that it will not be adversely affected by the impurities in the feed metal.

Provided on the periphery of each condensation vapor passage plate 5 is a flange that seals the gas containing the metal vapor by being fitted generally parallel to the inner surface of the tubular housing that defines the condensation zone. Better seal and greater rigidness can be assured by increasing the length of the vertical side of the flange. In order to prevent any displacement of the condensation vapor passage plates 5 and to ensure positive seal, the flange is preferably inclined by an angle not greater than one degree with the inner surface of the tubular housing defining the condensation zone. The condensation vapor passage plates 5 are such that condensation vapor passage plates 5 in the form of an inverted cone or dome which are each convex downwardly and provided with a vapor passage hole 4 in a generally central area and condensation vapor passage plates 5 in a conical or dome shape that are each convex upwardly and provided with a plurality of vapor passage holes 4 in the non-central area alternate with each other and are stacked in general symmetry with respect to a plane.

The vapor rising to pass through the vapor passage hole 4 in a generally central area of the downwardly convex condensation vapor passage plate 5 (see FIG. 2) then contacts the overlying upwardly convex condensation vapor passage plate 5 (see FIG. 3), whereupon the vapor condenses to form a melt, mainly from oxides, then from the metal, and as the melt undergoes another reaction for evaporation, the generated vapor flows laterally (toward the periphery) to diverge at the bottom of each of the holes 4 in the non-central area of the upwardly convex condensation vapor passage plate 5; the vapor goes up to pass through these holes 4 and flows again laterally (this time toward the center) to converge at the bottom of the vapor passage hole 4 in a generally central area of the overlying downwardly convex condensation vapor passage plate 5; the vapor then goes up and passes through this hole 4, whereby the required length of the condensation passageway for vapors is secured.

In addition, since the vapor is allowed to follow a zigzag path, its flow rate is sufficiently slowed down that part of the metal vapor generated from the feed metal in the feed crucible 1 is condensed in the condensation zone to yield a molten condensate having an increased total impurity content. The melt resulting from condensation in the condensation passageway for vapors that is defined by the downwardly convex plate 5 flows to converge at the hole 4 in a generally central area of this downwardly convex plate 5; the melt then flows down the hole 4 onto a generally central area of the underlying upwardly convex plate 5; the melt flows to diverge along the top surface of this plate 5 to reach a plurality of holes 4 in the non-central area of the plate 5, through which it flows down to the non-central area of the underlying downwardly convex plate 5; thereafter, the melt flows along the top surface of this plate 5 to converge at the hole 4 in a generally central area of the plate, through which it flows down into the underlying feed crucible 1. Thus, the ascending flow of the metal vapor is countercurrent with the descending flow of the molten concentrate in the vapor passageway, causing two kinds of fractionation, one being primarily by the vapor pressure and involving the passage of vapors and the other primarily by the melting point and involving the condensed metal. Another phenomenon that is believed to occur is the removal of deposits from the vapor passageways.

More than one vapor passage hole is preferably made in a generally central area of the downwardly convex condensation vapor passage plate 5 in the form of an inverted cone or dome. This plate alternates and is placed in superposition with the upwardly convex condensation vapor passage plate 5 in a conical or dome shape. A plurality of vapor passage holes 4 are made in the non-central area of this upwardly convex plate 5, preferably off-centered in the neighborhood of the periphery, most preferably on the periphery. In a desirable case, the holes 4 are made at generally equal spacings and their number is at least twice that of the vapor passage holes made in a generally central area of the downwardly convex condensation vapor passage plate 5 in the form of an inverted cone or dome. No more than 10 such holes are preferably made in the non-central area of the upwardly convex vapor passage plate 5 since stable vapor flows are difficult to form if the number of such holes exceeds 10. In order to ensure uniformity in the pressure and flow rate of vapors among the condensation passageways, the total area of the holes 4 is preferably adjusted to be the same in each of the condensation vapor passage plates 5. It is also preferred that two adjacent condensation vapor passage plates 5 are generally symmetrical with respect to a horizontal plane (excepting the positions and number of the vapor passage holes). The solidification zone is cooled to a temperature below the melting point of the metal so that the desired high-purity metal solidifies in the solidification crucible 2.

Provided on top of the solidification zone is an entrapment/solidification zone with an open top and an open bottom communicating with the top of the solidification zone and in which a plurality of entrapment/solidification vapor passage plates 7 that form an entrapment/solidification passageway for vapors which is cooled externally and in which said vapor after passing through said condensation zone is allowed to pass upwardly only through the vapor passage holes 4 made in said plates 7, thereby solidifying said vapor are stacked vertically at given spacings. The plurality of entrapment/solidification vapor passage plates 7 are such that entrapment/solidification vapor passage plates 7 in the form of an inverted cone or dome which are each convex downwardly and provided with a plurality of vapor passage hole 4 in the non-central area (preferably off-centered in the neighborhood of the periphery, more preferably on the periphery) and entrapment/solidification vapor passage plates 7 in a conical or dome shape that are each convex upwardly and provided with a vapor passage hole 4 in a generally central area alternate with each other and are stacked in general symmetry with respect to a plane. In order to ensure uniformity in the pressure and flow rate of vapors among the entrapment/solidification passageways, the total area of the holes 4 is preferably adjusted to be the same in each of the entrapment/solidification vapor passage plates 7. It is also preferred that two adjacent entrapment/solidification vapor passage plates 7 are generally symmetrical with respect to a horizontal plane (excepting the positions and number of the vapor passage holes). The entrapment/solidification zone is cooled to a temperature below the melting point of the metal so that the vapors are mostly solidified and recovered on the entrapment/solidification vapor passage plates 7. The method for fitting and sealing the entrapment/solidification vapor passage plates 7 to the inner surface of the tubular housing for the entrapment/solidification zone is the same as for fitting and sealing the condensation vapor passage plates 5 to the inner surface of the tubular housing for the condensation zone.

The feed crucible 1, solidification crucible 2, condensation vapor passage plates 5 and entrapment/solidification vapor passage plates 7 may be formed of any materials that are not reactive with the feed metal, the impurities in it and the process atmosphere and which yet can resist heat. Preferred examples are carbon and graphite. If desired, a single vessel of cylindrical shape may be used both as the feed crucible 1 and as the solidification crucible 2; if it is to be used as a solidification crucible, it is bottomless and held in the upper position.L but if it is to be used as a feed crucible, it may be furnished with a receptacle 8 at the bottom end that has a close fit to prevent leakage of the melt from the bottom. Thus, in order to further improve the purity of the metal solidified in the solidification crucible 2, the latter is lowered down to the feed heating zone as the solidified metal remains adhering to its inner surface and the second cycle of purification is performed using it as the feed crucible 1; in this way, a metal of even higher purity can be obtained while preventing the loss of the feed metal.

EXAMPLES

The following examples are provided for further illustrating the present invention but are in no way to be taken as limiting.

Example 1

Figure 1:
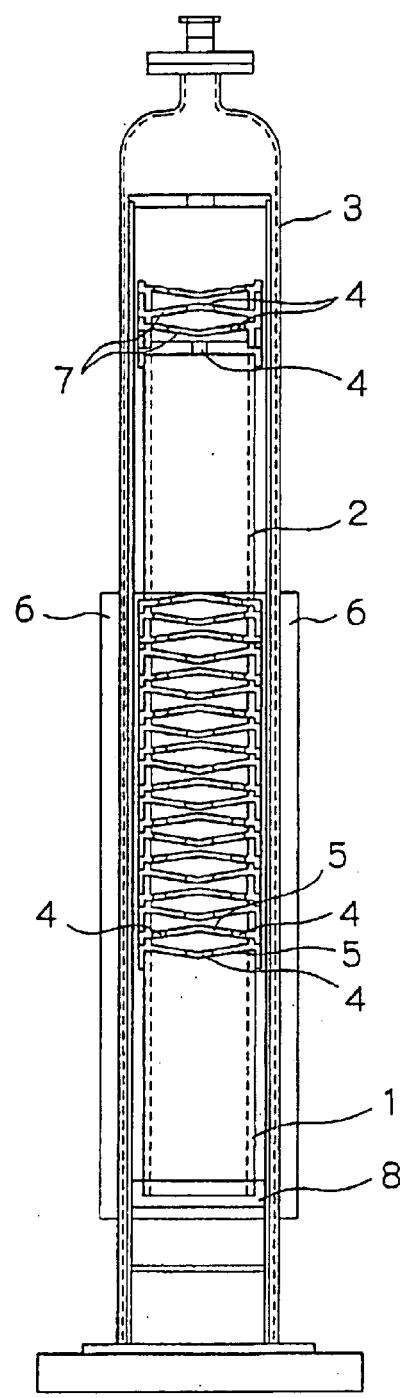
FIG. 1 is a vertical section of the purification apparatus according to the third aspect of the invention.

An apparatus of the type shown in FIG. 1 was used; it comprised a vertical stack of a feed heating zone having a feed crucible 1, a condensation zone have twenty condensation vapor passage plates 5, a solidification zone having a solidification crucible 2 and an entrapment/solidification zone having three entrapment/solidification vapor passage plates 7. Five hundred grams of 3N metallic magnesium containing-the impurities indicated in Table 1 to a total content of 395.55 ppm was charged into the feed crucible 1 as a feed metal. To purify the metal, the feed crucible 1 and the condensation vapor passage plates 5 were heated at controlled temperatures of 750° C. and 700° C., respectively, in a vacuum atmosphere of $1.3 \times 10^{-1}$ Pa ($10^{-3}$ Torr). The resulting solidified metal contained Cl, F and S in a respective amount of no more than 0.1 ppm, with a total impurity content of 0.75 ppm (6N). It was therefore the intended high-purity metallic magnesium of the invention. To achieve further purification, the solidified metal was used as a feed metal and subjected to another process of purification in the same apparatus, yielding a mass of high-purity (6N) metallic magnesium containing Cl, F and S in a total content of 0.03 ppm, with a total impurity content of 0.38 ppm (6N) (see Table 1). The theoretical yield of this high purity Mg was 70% as calculated for the Mg in the feed metal. Since the residual Mg in the feed crucible 1 could be used as a feed in the second cycle of purification, the overall yield was in excess of 80%. Elemental analysis for the impurities in the metal, both before and after purification, was conducted by glow discharge mass spectroscopy (GDMS).

TABLE 1

|  | S | Na | Al | Si | K | Ca | Cr | Mn |
|---|---|---|---|---|---|---|---|---|
| Feed Mg | 32.00 | 16.00 | 23.00 | 180.00 | 1.00 | 3.00 | 0.30 | 43.00 |
| High-purity Mg | 0.02 | — | — | 0.09 | — | — | — | 0.02 |

|  | Fe | Ni | Cu | As | Sb | Pb | F | P |
|---|---|---|---|---|---|---|---|---|
| Feed Mg | 16.00 | 3.60 | 12.00 | 0.55 | 2.00 | 17.00 | 1.00 | 27.00 |
| High-purity Mg | — | — | — | — | — | 0.22 | — | 0.02 |

TABLE 1-continued

|  | Cl | Ag | Bi,Ga,Li,Mo,Ti,B | TIC | Zn |
|---|---|---|---|---|---|
| Feed Mg | 18.00 | 0.10 | — | 395.55 | 30 |
| High-purity Mg | 0.01 | — | — | 0.38 | 1.7 |

(unit: ppm)
Notes:
TIC stands for "total impurity content".
"—" means "less than the detection limit".

Example 2

The process of Example 1 was repeated, except that 4N metallic zinc having the composition shown in Table 2 was used as the feed metal instead of the 3N Mg in Example 1 and that only one cycle of purification was performed in a vacuum atmosphere of 1.3 Pa ($10^{-2}$ Torr) with the feed crucible 1 and the condensation vapor passage plates 5 being held at controlled temperatures of 580° C. and 450° C., respectively. As a result, high-purity Zn was obtained that contained none of Cl, F and S, with a total impurity content of 0.01 ppm (see Table 2).

TABLE 2

|  | S | Na | Al | Si | K | Ca | Cr | Mn |
|---|---|---|---|---|---|---|---|---|
| Feed Zn | 1 | — | 0.04 | 0.97 | — | — | 0.08 | — |
| High-purity Zn | — | — | — | — | — | — | — | — |

|  | Fe | Ni | Cu | As | Sb | Pb | F | P |
|---|---|---|---|---|---|---|---|---|
| Feed Zn | 2.5 | 0.35 | 0.4 | — | 0.04 | 13 | — | — |
| High-purity Zn | — | — | — | — | — | — | — | — |

|  | Cl | Ag | Cd | Ti | TIC |
|---|---|---|---|---|---|
| Feed Zn | 0.1 | 1.9 | 0.31 | 8.7 | 29.39 |
| High-purity Zn | — | — | — | 0.01 | 0.01 |

(unit: ppm)
Notes:
TIC stands for "total impurity content".
"—" means "less than the detection limit".

According to the invention, magnesium and other metals of high purity ($\geqq 6N$) that contain Cl, F and S in a respective amount of no more than 0.1 ppm with a total impurity content of 1 ppm and less can be produced from feed metals in higher yield with higher efficiency at lower cost.

What is claimed is:

1. An apparatus for metal purification comprising a vessel for creating a vacuum atmosphere, a feed heating zone with an open top that contains a feed crucible to be charged with a feed metal, a condensation zone on top of said feed heating zone in which condensation vapor passage plates that are each convex downwardly and provided with a vapor passage hole in a generally central area and condensation vapor passage plates that are each convex upwardly and provided with a plurality of vapor passage holes in the non-central area alternate with each other at given spacings and are stacked in general symmetry with respect to a plane, and a solidification zone on top of said condensation zone for solidifying said metal.

2. An apparatus for metal purification comprising a vessel for creating a vacuum atmosphere, a feed heating zone with an open top that contains a feed crucible to be charged with a feed metal to generate the vapor of said metal, a condensation zone with an open top and an open bottom communicating with the top of said feed heating zone and in which a plurality of condensation vapor passage plates that form a condensation passageway for vapors in which said vapor is allowed to pass upwardly only through the vapor passage holes made in said condensation vapor passage plates are stacked vertically at given spacings, and a solidification zone with an open top and an open bottom communicating with the top of said condensation zone and which contains a solidification crucible which is cooled externally so that said metal of high purity is solidified from said vapor after it has passed through said condensation zone, said plurality of condensation vapor passage plates being such that condensation vapor passage plates in the form of an inverted cone or dome which are each convex downwardly and provided with a vapor passage hole in a generally central area and condensation vapor passage plates in a conical or dome shape that are each convex upwardly and provided with a plurality of vapor passage holes in a non-central area, alternate with each other and are stacked in general symmetry with respect to a plane, and a heater for heating said feed heating zone and said condensation zone being provided within or outside said vessel.

3. The apparatus according to claim 2, in which said vessel for creating a vacuum atmosphere further contains an entrapment/solidification zone with an open top and an open bottom communicating with the top of said solidification zone and in which a plurality of entrapment/solidification vapor passage plates that form an entrapment/solidification passageway for vapors which are cooled externally and which said vapor after passing through said condensation zone is allowed to pass upwardly only through the vapor passage holes made in said entrapment/solidification vapor passage plates, thereby solidifying said vapor, are stacked vertically at given spacings, said plurality of entrapment/solidification vapor passage plates being such that entrapment/solidification vapor passage plates in the form of an inverted cone or dome which are each convex downwardly and provided with a plurality of vapor passage hole in the non-central area and entrapment/solidification vapor passage plates in a conical or dome shape that are each convex upwardly and provided with a vapor passage hole in a generally central area alternate with each other and are stacked in general symmetry with respect to a plane.

4. The apparatus according to claim 3, wherein a flange is provided on the periphery of each condensation vapor passage plate.

5. The apparatus according to claim 4, wherein the flange is inclined by an angle not greater than one degree with an inner surface of a tubular housing defining the condensation zone.

6. The apparatus according to claim 5, wherein the bottommost condensation vapor passage plate is positioned at least 30 mm above a liquid level of molten metal in the feed crucible.

7. The apparatus according to claim 3, wherein a plurality of the vapor passage holes are in the non-central area of the condensation vapor passage plates.

8. The apparatus according to claim 7, wherein said plurality of holes are off-centered.

9. The apparatus according to claim 7, wherein there are no more than ten holes.

10. The apparatus according to claim 9, wherein the holes are substantially equally spaced from each other.

11. The apparatus according to claim 3, wherein the feed crucible, the solidification crucible and the condensation vapor plates are made of carbon.

12. The apparatus according to claim 3, wherein the feed crucible, the solidification crucible and the condensation vapor plates are made of graphite.

13. The apparatus according to claim 3, wherein a single cylindrical shaped vessel is utilized as both the feed crucible and the solidification crucible.

* * * * *